(12) United States Patent
Du et al.

(10) Patent No.: US 10,436,009 B2
(45) Date of Patent: Oct. 8, 2019

(54) APPARATUS FOR TESTING THE FUNCTION AND PERFORMANCE OF A ROTARY STEERABLE TOOL IN A HORIZONTAL OR INCLINED STATE

(71) Applicant: Institute of Geology and Geophysics, Chinese Academy of Sciences, Beijing (CN)

(72) Inventors: Jiansheng Du, Beijing (CN); Qingyun Di, Beijing (CN); Zili Wang, Beijing (CN); Wenxuan Chen, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/158,156

(22) Filed: Oct. 11, 2018

(65) Prior Publication Data

US 2019/0106975 A1    Apr. 11, 2019

(30) Foreign Application Priority Data

Oct. 11, 2017    (CN) .......................... 2017 1 0943732

(51) Int. Cl.
*E21B 44/00*    (2006.01)
*G01M 13/00*    (2019.01)
*E21B 7/04*    (2006.01)

(52) U.S. Cl.
CPC ................ *E21B 44/00* (2013.01); *E21B 7/04* (2013.01); *G01M 13/00* (2013.01)

(58) Field of Classification Search
CPC .......... E21B 44/00; E21B 7/04; G01M 13/00
See application file for complete search history.

(56) References Cited

FOREIGN PATENT DOCUMENTS

CN    207423503 U    *    5/2018

OTHER PUBLICATIONS

Xue et al., "Continuous Real-Time Measurement of Drilling Trajectory With New STate-Space Models of Kalman Filter", IEEE Transactions on Instrumentation and Measurement, vol. 65, No. 1, Jan. 2016, pp. 144-153 (Year: 2016).*
English Machine Translation of CN207423503U, translated online May 2019 (Year: 2018).*

* cited by examiner

*Primary Examiner* — David Z Huang
(74) *Attorney, Agent, or Firm* — Novick, Kim & Lee, PLLC; Allen Xue (57) ABSTRACT

The present invention relates to the technical field of rotary steerable drilling, particularly to an apparatus for testing the function and performance of a rotary steerable tool in a horizontal or inclined state. The apparatus comprises a rotary steerable tool testing bench configured to provide a horizontal state and an inclined state for a rotary steerable tool so as to simulate a horizontal drilling state or a directional drilling state on the ground; and a rotary steerable tool function and performance testing unit disposed on the rotary steerable tool testing bench to test the function and performance of the rotary steerable tool in the horizontal drilling state or the directional drilling state. The apparatus in the present invention can test the function and performance of a push-the-bit rotary steerable tool under horizontal and inclined conditions on the ground in a lab.

9 Claims, 7 Drawing Sheets

APPARATUS FOR TESTING THE FUNCTION AND PERFORMANCE OF A ROTARY STEERABLE TOOL IN A HORIZONTAL OR INCLINED STATE

TECHNICAL FIELD

The present invention relates to the technical field of rotary steerable drilling, particularly to an apparatus for testing the function and performance of a rotary steerable tool in a horizontal or inclined state.

BACKGROUND ART

Rotary steerable drilling technology belongs to the field of directional drilling, can control the drilling direction of a drill bit at high precision under a rotation condition of a drilling tool, and can greatly improve drilling efficiency and increase effective drilling catching rate in reservoirs. Hence, rotary steerable drilling is a developing trend of intelligent drilling techniques in the future. Among the techniques, the functional and performance test of rotary steerable tools in a horizontal or inclined state on the ground in a lab is a necessary link. Rotary steerable systems are mainly classified into push-the-bit rotary steerable systems and point-the-bit rotary steerable systems. Push-the-bit steerable tools mainly rely on three evenly distributed ribs to push against a well wall so as to control the direction of the drill bit.

At present, there is no matured apparatus for testing the function and performance of a push-the-bit rotary steerable tool in a horizontal or inclined state on the ground in a lab yet. For instance, the rotary steerable actuator testing apparatus disclosed in the patent document CN 201611244930 is designed for static pushing force or displacement test, in which the steerable tool doesn't rotate, but can only be tested in a vertical state. The testing apparatus disclosed in the patent document CN 201310213082 can only test a fully-rotary steerable tool, but can't test a push-the-bit steerable tool in the existence of a static non-rotary steering sleeve.

CONTENTS OF THE INVENTION

In view of the above technical problems, the present invention provides an apparatus for testing the function and performance of a rotary steerable tool in a horizontal or inclined state. With the apparatus, a horizontal drilling state and a directional drilling state of a rotary steerable tool under a horizontal or inclined state can be simulated, and necessary function and performance test of the rotary steerable tool can be performed in those states. The function and performance test tasks that can be accomplished with the testing apparatus for a rotary steerable tool in those states include: high precision measurement of pushing force of three ribs of the rotary steerable tool and real-time display of force signal feedback; two-way communication and power supply performance test of a coupling transformer of the steering tool under a rotation condition of a mandrel of the rotary steerable tool; and force vector following and keeping function and performance test of a non-rotary steering sleeve of the steering tool under a low-speed rotation condition.

The object of the present invention is attained with the following technical scheme:
An apparatus for testing the function and performance of a rotary steerable tool in a horizontal or inclined state, comprising a rotary steerable tool testing bench configured to provide a horizontal state and an inclined state for a rotary steerable tool so as to simulate a horizontal drilling state or a directional drilling state on the ground; and a rotary steerable tool function and performance testing unit disposed on the rotary steerable tool testing bench to test the function and performance of the rotary steerable tool in the horizontal drilling state or the directional drilling state.

Furthermore, the rotary steerable tool function and performance test unit comprises a testing assembly for pushing force measurement of ribs and force signal feedback and/or a low-speed rotation driving control assembly of a non-rotary steering sleeve of the rotary steerable tool;
the testing assembly for pushing force measurement of ribs and force signal feedback (i.e., a testing assembly for testing the pushing force of ribs and force signal feedback) is positioned and disposed on the non-rotary steering sleeve of the rotary steerable tool, and can measure the pushing force of ribs of the rotary steerable tool, wherein, the ribs may be in a quantity of three or four ribs, a test signal of the force of the ribs is feed via a slip ring assembly back to a signal acquisition hardware interface box, which is connected to an upper touch display computer to display the feedback test signal of the force in real time;
the low-speed rotation driving control assembly of the non-rotary steering sleeve of the rotary steerable tool is configured to drive the non-rotary steering sleeve of the rotary steerable tool to rotate at a low speed, so as to test a following feature of the rotary steerable tool under a condition that a force vector of the rotary steerable tool rotates following the non-rotary steering sleeve of the rotary steerable tool.

Furthermore, the testing assembly for pushing force measurement of ribs and force signal feedback comprises ribs of rotary steerable tool, universal load-bearing feet, adjusting studs, pushing force sensors, connectors, and top beams; the rotary steerable tool ribs are always in contact with the universal load-bearing feet during operation, the universal load-bearing feet are connected with the adjusting studs via threads, the adjusting studs are connected with the pushing force sensors via threads, the upper ends of the pushing force sensors are connected with the connectors, the connectors are connected with the top beams, and the feet on both sides of each of the top beams are placed in lower slots of tension-bearing cover plates and outer slots of tension-bearing bases; the tension-bearing cover plates are connected with the tension-bearing bases; and an action-reaction force equilibrium is established against the pushing force of the ribs via the universal load-bearing feet, the adjusting studs, the connectors, the top beams, the tension-bearing cover plates, and the tension-bearing bases, so that the pushing force of the ribs can be measured.

Furthermore, the tension-bearing bases are in clearance fit with the main body of the non-rotary steering sleeve of the rotary steerable tool, the tension-bearing bases can be slidably adjusted in the axial direction of the non-rotary steering sleeve of the rotary steerable tool, and the tension-bearing bases can be mounted and positioned by screwing down bolts into threaded through-holes in the tension-bearing bases so that the bolts abut against the external surface of the non-rotary steering sleeve of the rotary steerable tool; and split limit rings are disposed on both sides of each of the tension-bearing bases so as to position the tension-bearing bases in the axial direction as required.

Furthermore, the low-speed rotation driving control assembly of the non-rotary steering sleeve of the rotary steerable tool comprises a servo motor, a worm and gear reducer, a small toothed pulley, a base plate and cross braces; the servo motor, the worm and gear reducer and the small toothed pulley are positioned on the base plate via connecting holes located in a lower portion of the worm and gear reducer, the base plate is connected with the cross braces by bolts, and the cross braces are positioned and disposed in sliding channels of upper cross beams.

Furthermore, the rotary steerable tool testing bench comprises upper cross beams, fixed support columns, detachable support columns, lower cross beams, and lateral stabilizing support feet; the upper cross beams are connected with the lower cross beams via the fixed support columns and the detachable support columns, the lateral stabilizing support feet are articulated via pin shafts with trunnions connected to the lower cross beams, the articulation can be freely moved to a certain angle, and detachable limit pins are disposed on the trunnions;

and the fixed support columns are disposed at one end of the rotary steerable tool testing bench, articulation structures are disposed on the fixed support columns, and the articulation structures comprise female articulation members disposed at upper ends of the fixed support columns and male articulation members 23 disposed on the upper cross beams.

Furthermore, the rotary steerable tool testing bench comprises a horizontal state and an inclined state; when the rotary steerable tool testing bench is in the horizontal state, the detachable support columns comprise planar support columns in the same length;

and when the rotary steerable tool testing bench is transited from the horizontal state to the inclined state, the detachable support columns comprise different bevel support columns; one end of each of the upper cross beams without the articulation structure is lifted, the upper cross beams are rotated around the articulation structures by a certain angle as required, and bevel support columns in different heights and upper support plates are arranged, so that the rotary steerable tool testing bench is transited from the horizontal state to a stable inclined state.

Furthermore, the apparatus further comprises an upper bearing support assembly and a lower bearing support assembly 5, and the rotary steerable tool is positioned on the upper cross beams of the rotary steerable tool testing bench via the upper bearing support assembly and the lower bearing support assembly.

Furthermore, the upper bearing support assembly comprises a first upper bearing cover, a first lower bearing seat and a first bearing, and the first upper bearing cover and the first lower bearing seat are of a split structure, the first upper bearing cover and the first lower bearing seat are connected by bolts, and the first bearing is positioned between the first upper bearing cover and the first lower bearing seat; the first lower bearing seat is fixed on the bottom plate of an upper support base, which is fixed in transverse slots of the cross braces, and the first lower bearing seat is movable along the transverse slots of the cross braces, so that the upper end of the rotary steerable tool can be mounted and adjusted in the transverse direction.

Furthermore, the lower bearing support assembly comprises a second upper bearing cover, a second lower bearing seat and a second bearing, and the second upper bearing cover and the second lower bearing seat are of a split structure, the second upper bearing cover and the second lower bearing seat are connected by bolts, and the second bearing is positioned between the second upper bearing cover and the second lower bearing seat; the second lower bearing seat is fixed on the bottom plate of a lower support base, which is fixed in transverse slots of the cross braces, and the second lower bearing seat is movable along the transverse slots of the cross braces, so that the lower end of the rotary steerable tool can be mounted and adjusted in the transverse direction.

The present invention has advantageous technical effects:

1. The testing bench of the apparatus in the present invention employs articulation structures, and thereby can be transited from a horizontal state to an inclined state conveniently without adjusting the base assembly, the rotary steerable tool, and auxiliary testing assemblies, etc. in a wide range.

2. The testing assembly for force measurement of three ribs and force signal feedback in the present invention can realize adjustment and positioning in an axial position as required according to different positions of the ribs of the rotary steerable tool, and is highly universal, convenient to mount and positioning, and easy to remove and manufacture.

3. Utilizing mechanisms such as worm and gear reducer and toothed belt transmission assembly, etc., the apparatus in the present invention completely eliminates a difficulty that the rotation speed of the steering sleeve can't be accurately controlled owing to the bearing friction force between the rotary steerable mandrel and the non-rotary steering sleeve.

4. The upper support assembly and the lower support assembly of the rotary steerable tool employ sliding channels for adjustment and fixing, and thereby the upper support base can be adjusted flexibly according to the specific length of the rotary steerable tool so that the upper support base can be mounted and positioned easily. Therefore, the apparatus is highly universal and convenient to mount and adjust.

BRIEF DESCRIPTION OF DRAWINGS

FIG. 14 shows the lower bearing support assembly of the rotary steerable tool; Reference Numbers: 1—rotary steerable tool testing bench; 2—testing assembly for pushing force measurement of three ribs of the rotary steerable tool and force signal feedback; 3—low-speed rotation driving control assembly of the non-rotary steering sleeve of the rotary steerable tool; 4—upper bearing support assembly; 5—lower bearing support assembly; 6—push-the-bit rotary steerable tool; 7—signal acquisition hardware interface box; 8—upper touch display computer; 9—24-core slip ring assembly; 10—4-core slip ring assembly; 12—fixed support column; 11, 14—planar support column; 13—upper cross beam; 15—lateral stabilizing support foot; 16—articulation structure; 17—limit pin; 18—pin shaft; 19—trunnion; 20—lower cross beam; 21—female articulation member; 22—pin shaft; 23—male articulation member; 24—non-rotary steering sleeve of rotary steerable tool; 24.1—ribs; 25—mandrel; 25.1—connector; 26—mandrel driving servo motor; 27—non-rotary steering sleeve driving servo motor; 28-33—bevel support column; 34—diagonal strut; 35, 36—reinforcing corner piece; 37—upper lateral support plate; 38—top beam; 38.1—foot at the side of top beam; 39—split limit ring; 40—adjusting stud; 40.1—pushing force sensor; 41—universal load-bearing foot; 42—tension-bearing cover plate; 43—tension-bearing base; 43.1—positioning bolt; 44—connector; 45—upper half ring of split limit ring; 46—lower half ring of split limit ring; 47—half ring connecting bolt; 48—small toothed pulley; 49—big toothed pulley; 50—toothed belt; 51—worm and gear reducer; 52—cross brace; 53—reinforcing rib; 54—adjusting corner piece; 55—adjusting bolt; 56—base plate; 57—axial adjusting slot; 58—first upper bearing cover; 59—first lower bearing seat; 60—first connecting bolt; 61—bottom plate of upper support base; 62—first bearing; 63—second lower bearing seat; 64—second upper bearing cover; 65—second bearing; 66—second connecting bolt; 67—bottom plate of lower support base.

EMBODIMENTS

Hereunder the present invention will be further detailed in embodiments with reference to the accompanying drawings, to make the object, technical scheme, and advantages of the present invention understood more clearly. It should be understood that the embodiments described here are only provided to explain the present invention, but shall not be deemed as constituting any limitation to the present invention.

Rather, the present invention is intended to encompass any alternation, modification, equivalent method or scheme worked out without departing from the spirit and scope of the present invention as defined by the claims. Furthermore, some specific details are described in at large in the following detailed description of the present invention, to enable the public to understand the present invention better. However, those skilled in the art can fully understand the present invention even without the description of those details.

Embodiment 1

In this embodiment, an apparatus for testing the function and performance of a rotary steerable tool in a horizontal or inclined state is provided. The apparatus comprises a rotary steerable tool testing bench 1 configured to provide a horizontal state and an inclined state for a rotary steerable tool 6, so as to simulate a horizontal drilling state or a directional drilling state on the ground; and a rotary steerable tool function and performance testing unit disposed on the rotary steerable tool testing bench 1 to test the function and performance of the rotary steerable tool 6 in the horizontal drilling state or the directional drilling state.

As shown in FIGS. 1-6, a push-the-bit rotary steerable tool 6 is positioned on upper cross beams 13 of the rotary steerable tool testing bench 1 via an upper bearing support assembly 4 and a lower bearing support assembly 5. A testing assembly 2 for pushing force measurement of three ribs of the rotary steerable tool and force signal feedback is positioned on a non-rotary steering sleeve 24 of the rotary steerable tool and configured to test the magnitude of the pushing force of three ribs of the rotary steerable tool. Since the non-rotary steering sleeve 24 is rotated at a low speed (3-20 RPH) with respect to the testing bench, a test signal of the force of the three ribs is fed via a 24-core slip ring assembly 9 back to a signal acquisition hardware interface box 7 of the entire testing apparatus, and the acquired signal is conditioned and then routed to an upper touch display computer 8.

Figure 1:
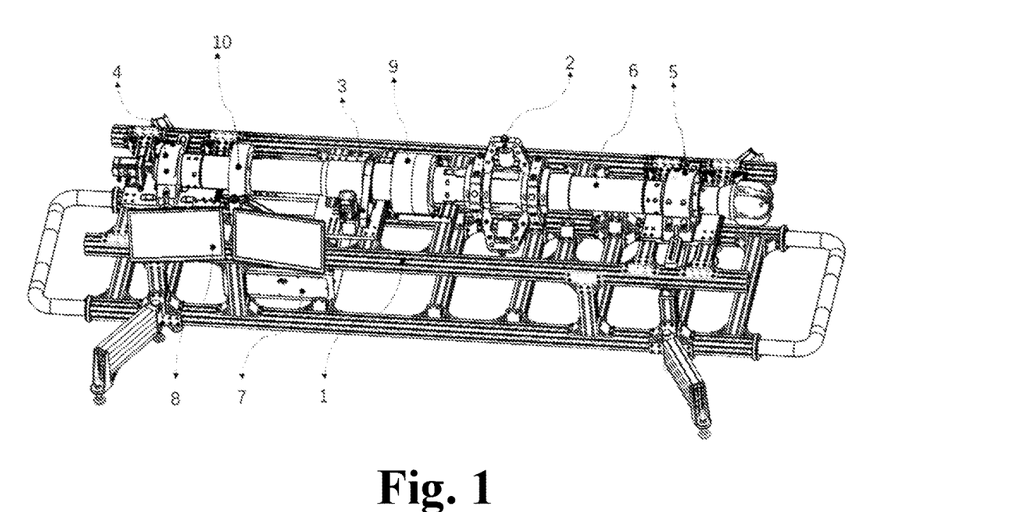
FIG. 1 is a schematic diagram of the apparatus for testing the function and performance of a rotary steerable tool in a horizontal or inclined state according to an embodiment.
Figure 2:
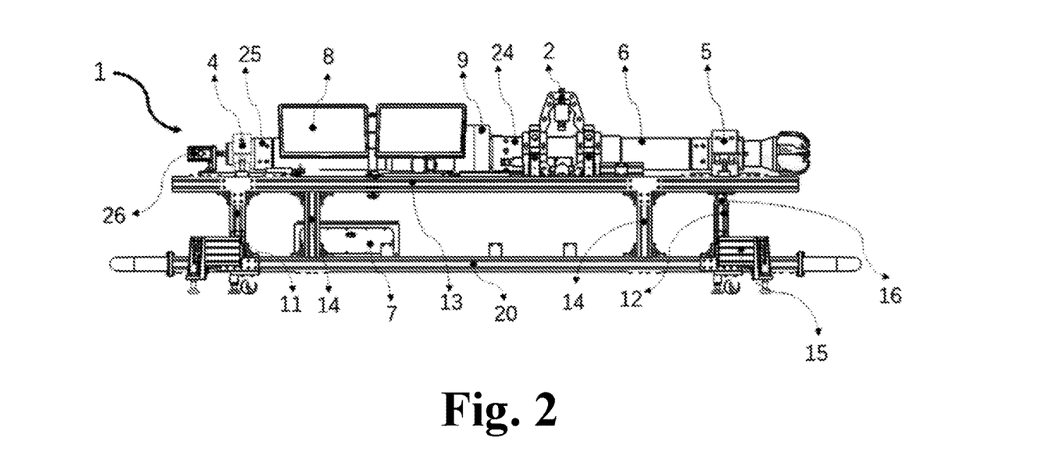
FIG. 2 is a side view of the apparatus for testing the function and performance of a rotary steerable tool in a horizontal or inclined state according to an embodiment in a horizontal state.
Figure 3:
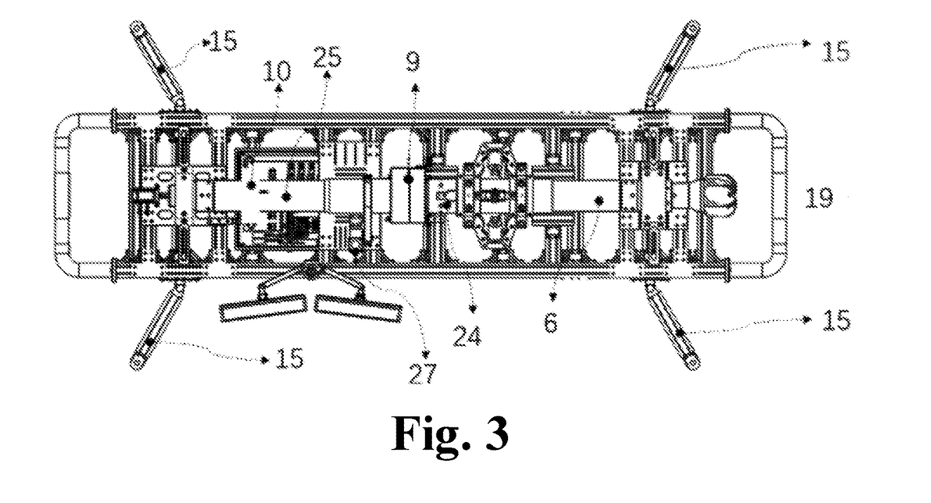
FIG. 3 is a top view of the apparatus for testing the function and performance of a rotary steerable tool in a horizontal or inclined state according to an embodiment in a horizontal state.

A mandrel 25 in the rotary steerable tool is rotated at a high speed (400 RPM) with respect to the bench, a primary high-frequency modulation circuit, a two-way communication circuit and the like of an electric power coupling transformer located in the mandrel 25 of the rotary steerable tool requires an external power source and an external control signal source provided outside the testing bench, and the external power source and the external control signal source are connected to a 4-core slip ring assembly 10 through cables via the hardware interface box 7. The external power source and the external control signal source transfer external electric power and control signals via the slip ring assembly 10 to a mandrel control circuit.

The low-speed rotation driving control assembly 3 of the non-rotary steering sleeve of the rotary steerable tool is configured to drive the non-rotary steering sleeve 24 of the rotary steerable tool to rotate at a low speed (3-20 RPH). Since the non-rotary steering sleeve 24 and the mandrel 25 in the rotary steerable tool are supported by hard alloy bearings, the friction force is high, and the steering sleeve may rotate when the mandrel 25 rotates, and the rotation speed of the steering sleeve is unstable. In the high-speed rotation process of the mandrel, the non-rotary steering sleeve 24 may rotate at a speed higher than the design speed (3-20 RPH). The low-speed rotation driving control assembly 3 of the non-rotary steering sleeve of the rotary steerable tool provided in this embodiment enables testing the following feature of the steerable tool under a condition that the force vector of the steerable tool rotates following the steering sleeve, without limitation to factors such as the friction of the rotary steerable slide bearings, and enables controlling the rotation speed accurately. Besides, the apparatus in the present invention supports adjusting and positioning the speed control assembly in the axial direction as required, and has advantages such as high flexibility, and convenient mounting and positioning, etc.

Figure 10:
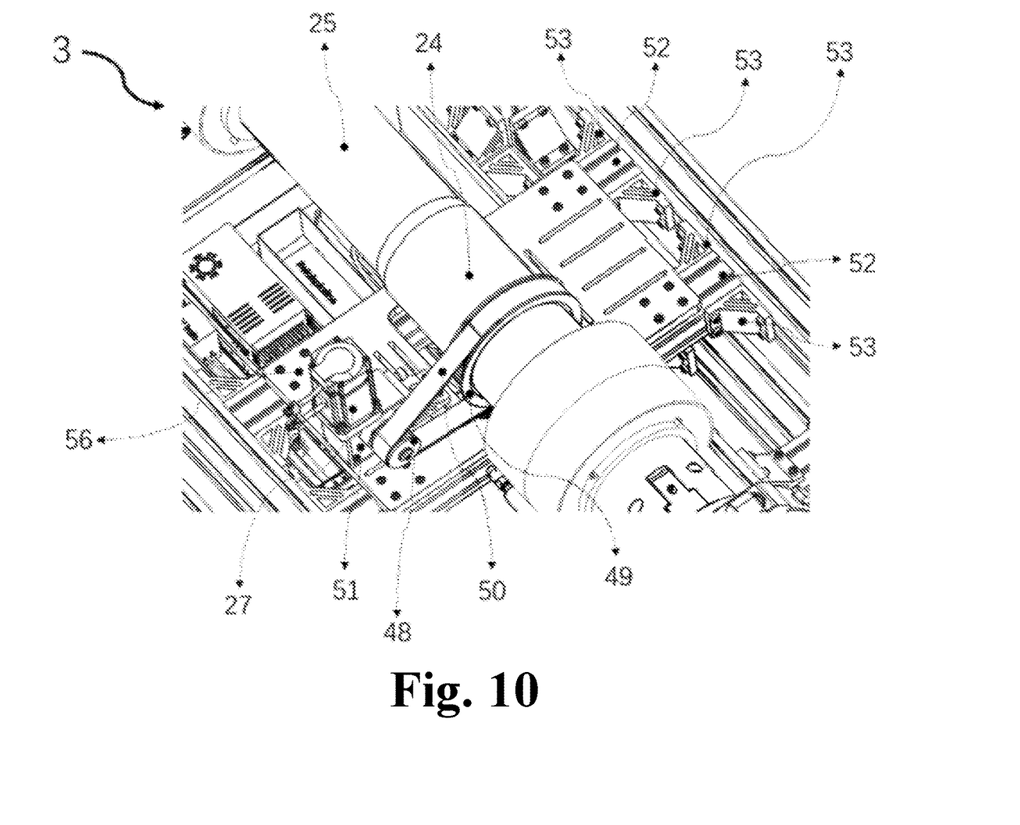
FIG. 10 shows the low-speed rotation driving control assembly of the non-rotary steering sleeve of the rotary steerable tool according to any embodiment.
Figure 11:
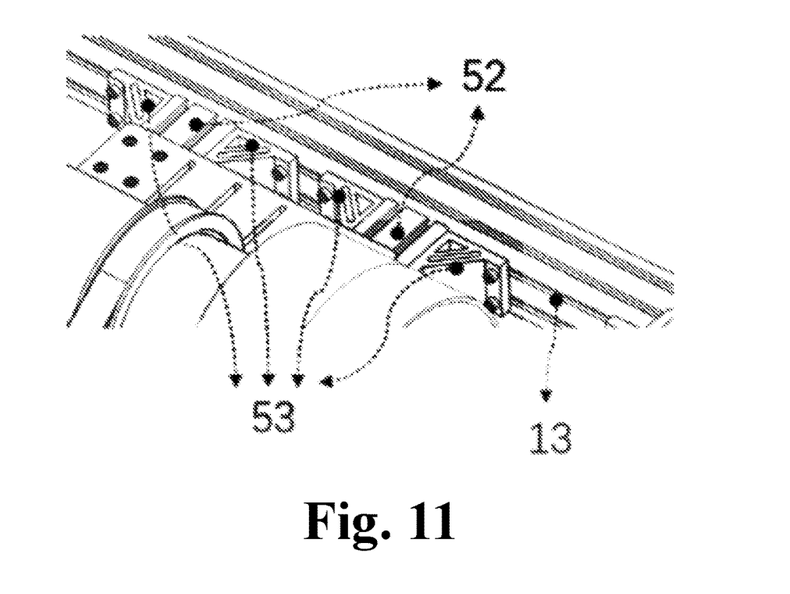
FIG. 11 is a schematic diagram of positioning of the cross braces according to an embodiment.
Figure 12:
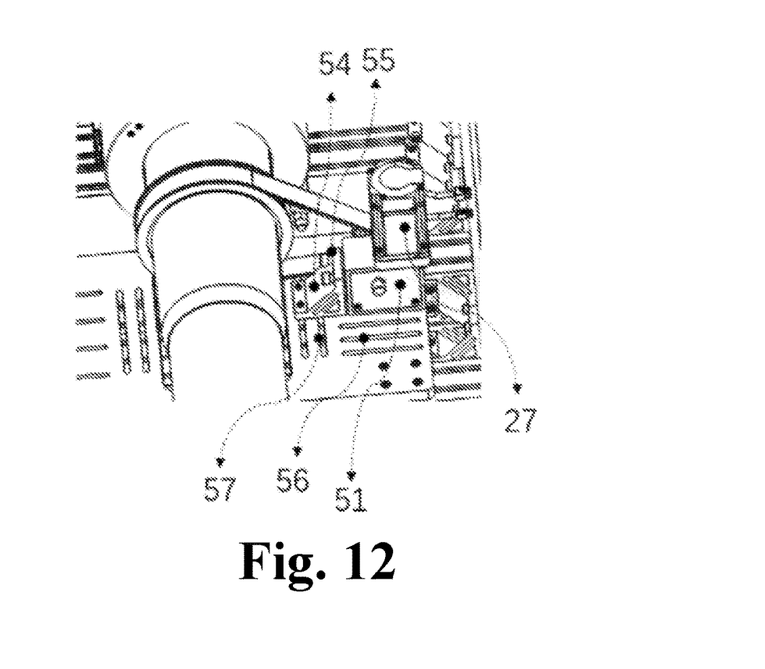
FIG. 12 is a schematic diagram of the fixing of the motor reducer to the bottom plate according to an embodiment.

As shown in FIGS. 10-12, the low-speed rotation driving control assembly 3 of the non-rotary steering sleeve of the rotary steerable tool comprises a servo motor 27, a worm and gear reducer 51, a small toothed pulley 48, a base plate 56 and cross braces 52; the servo motor 27, the worm and gear reducer 51 and the small toothed pulley 48 are positioned on the base plate 56 via connecting holes located in a lower portion of the worm and gear reducer 51, the base plate 56 is connected with the cross braces 52 by bolts, and the cross braces 52 are positioned and disposed in sliding channels of upper cross beams 13 by means of several reinforcing ribs 53 and corresponding bolts. In the mounting process, adjustment may be made according to the specific axial length of the steering sleeve of the rotary steerable tool, and then positioning may be accomplished with the reinforcing ribs 53 by tightening up corresponding bolts.

Utilizing a worm and gear reducer 51 and toothed belt drive assemblies 48, 49 and 50, the low-speed rotation driving control assembly of the non-rotary steering sleeve of the rotary steerable tool completely eliminate a difficulty that the rotation speed of the steering sleeve can't be controlled accurately owing to the bearing friction force between the rotary steerable mandrel 25 and the non-rotary steering sleeve 24.

The servo motor 27 and the worm and gear reducer 51 are connected with each other via a flange and a key groove thereon, to transfer power to the gear reducer 51. An output shaft of the reducer is connected to the small toothed pulley 48, which is connected to a big toothed pulley 49 via a toothed belt 50; the big toothed pulley 49 is of a through-hole structure, is in clearance fit with the steering sleeve of the rotary steerable tool, and is positioned on the non-rotary steering sleeve 24 of the rotary steerable tool by screwing down a pointed set screw mounted on the big toothed pulley.

The rotary steerable tool testing bench 1 comprises upper cross beams 13, fixed support columns 12, detachable support columns, lower cross beams 20, and lateral stabilizing support feet 15; the testing assembly composed of the rotary steerable tool 6 and the drive assembly and the testing assembly 2 positioned on the rotary steerable tool 6, etc. is positioned on the upper cross beams 13, the upper cross beams are connected to the lower cross beams 20 via the support columns, and the fixed support columns 12 are disposed at one end of the rotary steerable tool testing bench 1; anchor bolts are provided at bottoms of the lower cross beams 20. In view that the rotary steerable tool may vibrate in a high-speed rotation state, the apparatus in the present invention is specially designed with lateral stabilizing support feet 15 in order to improve lateral stability and vibration resistance. The lateral stabilizing support feet 15 are articulated via pin shafts 18 to trunnions 19 connected to the lower cross beams 20, and the articulation can be moved freely to a certain angle; detachable limit pins 17 are provided on the trunnions 19; by designing the detachable limit pins 17 appropriately, the apparatus supports angular adjustment up to ±45°, so as to adjust the lateral supporting stability of the testing bench. Besides, in a non-test state, the lateral stabilizing support feet 15 may be folded by pulling out the limit pins on both sides to reduce the occupied space.

Figure 4:
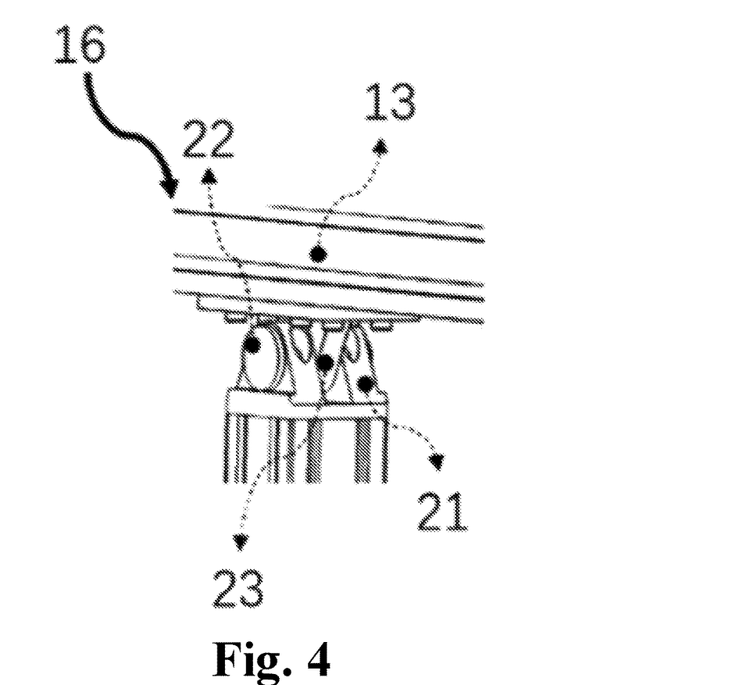
FIG. 4 is a schematic diagram of the articulation structure of the apparatus for testing the function and performance of a rotary steerable tool in a horizontal or inclined state according to an embodiment.

Furthermore, the apparatus is further provided with articulation structures 16 on the fixed support columns 12, and each of the articulation structures 16 comprises a female articulation member 21 disposed at the upper end of the fixed support column 12 and a male articulation member 23 disposed on the upper cross beam 13; the female articulation member 21 is fixed to the fixed support column 12 by screws, and is articulated via the pin shaft 22 to the male articulation member 23 connected to the upper cross beam 13. Here, the articulation structures 16 are designed for the following purpose: the horizontal testing bench of the apparatus in the present invention employs the articulation structures 16, and thereby can be transited from a horizontal state to an inclined state conveniently without adjusting the base assembly, the rotary steerable tool, and auxiliary testing assemblies, etc. in a wide range. In view that the rotary steerable tool and its associated testing apparatus are heavy, the apparatus described above can be converted in a horizontal state into an inclined testing bench rapidly and safely by means of the articulation structures 16.

Figure 5:
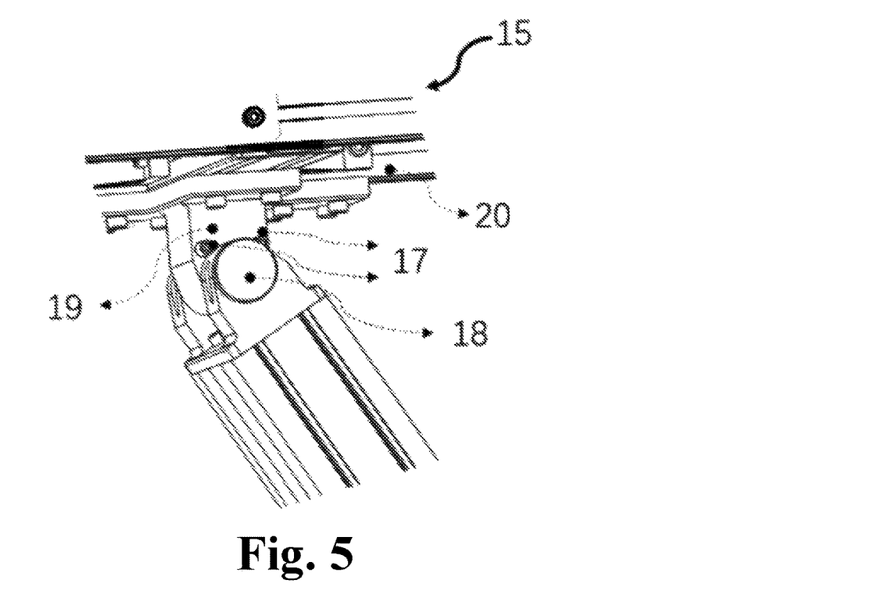
FIG. 5 is a schematic diagram of the lateral stabilizing support foot of the apparatus for testing the function and performance of a rotary steerable tool in a horizontal or inclined state according to an embodiment.

In addition, by utilizing articulation structures for the lateral stabilizing support feet 15 and the lower cross beams 20 of the base of the testing bench, the lateral supporting distance may be adjusted flexibly according to the vibration condition of the rotary steerable tool during the test.

The apparatus in this embodiment enables testing the rotary steerable tool in a horizontal state, at 90°, and in an inclined state.

Figure 6:
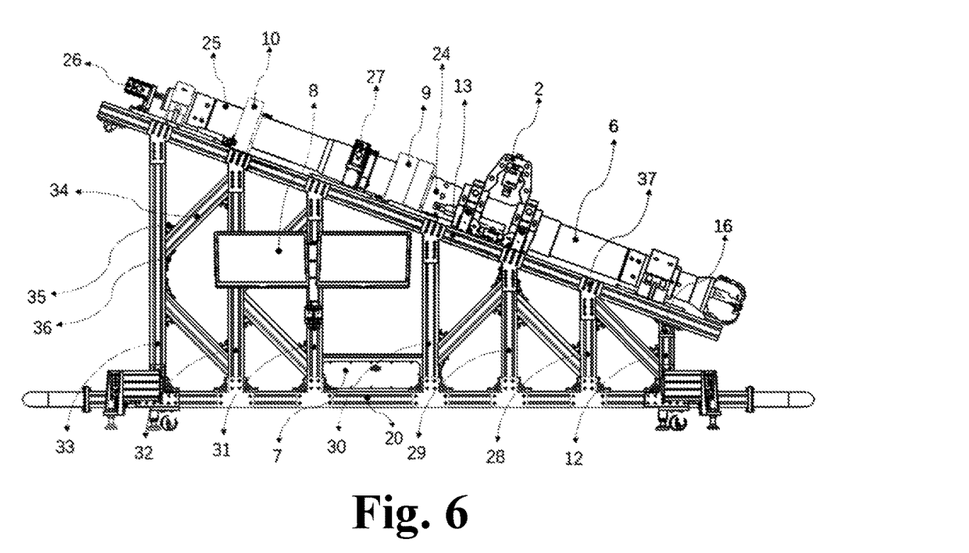
FIG. 6 is a schematic diagram of the apparatus for testing the function and performance of a rotary steerable tool in a horizontal or inclined state according to an embodiment in an inclined state.

When the rotary steerable tool testing bench 1 is in the horizontal state, the detachable support columns comprise planar support columns 11, 14 in the same length;

when the rotary steerable tool testing bench 1 is transited from the horizontal state to an inclined state, the end of each of the upper cross beams 13 without articulation structure is lifted up, and the planar support columns 11, 14 are removed; and the upper cross beams 13 are rotated around the articulation structures 16 by a certain angle as required, and bevel support columns 28-33 in different heights, upper support plates 37, and lower reinforcing ribs are arranged, so that the rotary steerable tool testing bench 1 is transited from the horizontal state to a stable inclined state. To ensure lateral stability and rigidity of the inclined testing bench, the apparatus in the present invention employs several diagonal struts 34, and the diagonal struts 34 are connected with corresponding reinforcing corner pieces 35, 36 by bolts between the respective bevel support columns.

Figure 7:
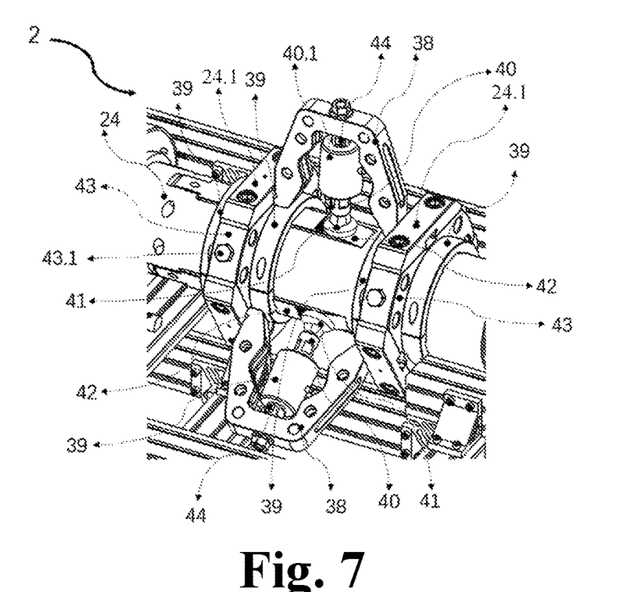
FIG. 7 shows the testing assembly for pushing force measurement of three ribs of the rotary steerable tool and force signal feedback according to an embodiment.
Figure 8:
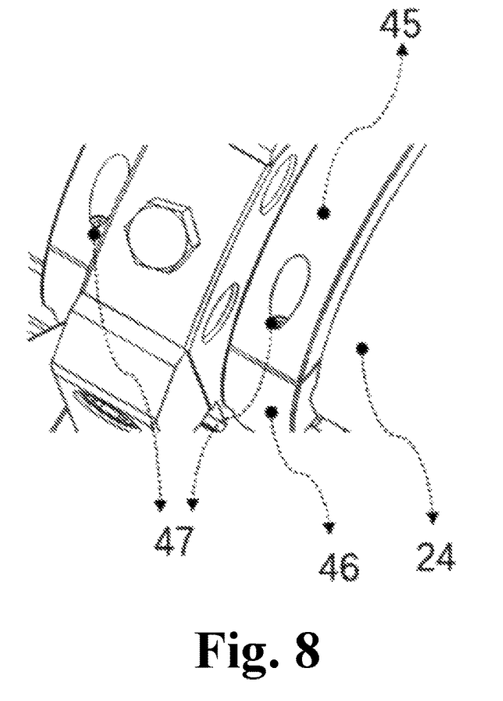
FIG. 8 is a schematic structural diagram of the split limit ring of the apparatus for testing the function and performance of a rotary steerable tool in a horizontal or inclined state according to an embodiment.
Figure 9:
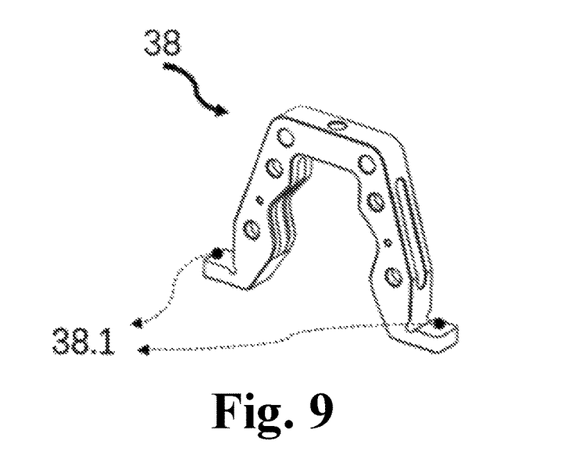
FIG. 9 is a schematic diagram of the top beam support feet of the apparatus for testing the function and performance of a rotary steerable tool in a horizontal or inclined state according to an embodiment.

The rotary steerable tool function and performance test unit comprises a testing assembly 2 for pushing force measurement of ribs and force signal feedback, which is positioned and disposed on the non-rotary steering sleeve 24 of the rotary steerable tool;

as shown in FIGS. 7-9, the testing assembly 2 for pushing force measurement of ribs and force signal feedback comprises rotary steerable tool ribs 24.1, universal load-bearing feet 41, adjusting studs 40, pushing force sensors 40.1, connectors 44, and top beams 38; the rotary steerable tool ribs 24.1 are always in contact with the universal load-bearing feet 41 during operation, the universal load-bearing feet 41 are connected with the adjusting studs 40 via threads, the adjusting studs 40 are connected with the pushing force sensors 40.1 via threads, the upper ends of the pushing force sensors 40.1 are connected with the connectors 44, the connectors 44 are connected with the top beams 38, and the feet 38.1 on both sides of each of the top beams 38 are placed in lower slots of tension-bearing cover plates 42 and outer slots of tension-bearing bases 43; the tension-bearing cover plates 42 are connected with the tension-bearing bases 43; an action-reaction force equilibrium is established against the pushing force of the ribs 24.1 via the universal load-bearing feet 41, the adjusting studs 40, the connectors 44, the top beams 38, the tension-bearing cover plates 42, and the tension-bearing bases 43, so that the pushing force of the ribs can be measured. When the three ribs of the rotary steerable tool 6 operate simultaneously and the pressure is stabilized, the three force systems are balanced, and internal force is established, wherein, the internal force only acts on the tension-bearing base 43 but doesn't act on the main body of the rotary steerable tool, and thereby provides a good protective effect for the entire testing bench.

The tension-bearing bases 43 are in clearance fit with the main body of the non-rotary steering sleeve 24 of the rotary steerable tool, the tension-bearing bases 43 can be slidably adjusted in the axial direction of the non-rotary steering sleeve 24 of the rotary steerable tool, and the tension-bearing bases 43 can be mounted and positioned by screwing down bolts into threaded through-holes in the tension-bearing bases 43 so that the bolts abut against the external surface of the non-rotary steering sleeve 24 of the rotary steerable tool; in addition, split limit rings 39 (each of the split limit rings comprises an upper half ring 45 of split limit ring and a lower half ring 46 of split limit ring) are provided on both sides of the tension-bearing base 43, and the split limit rings are tightened up by means of half-connection bolts 47 so that the split limit rings embrace the external surface of the non-rotary steering sleeve 24 of the rotary steerable tool tightly, and thereby the tension-bearing base 43 can be positioned as required in the axial direction. Therefore, the testing assembly 2 for force measurement of three ribs and force signal feedback in this embodiment can realize adjustment and positioning in an axial position as required according to different positions of the ribs of the rotary steerable tool, and is highly universal, convenient to mount and positioning, and easy to remove and manufacture.

Figure 13:
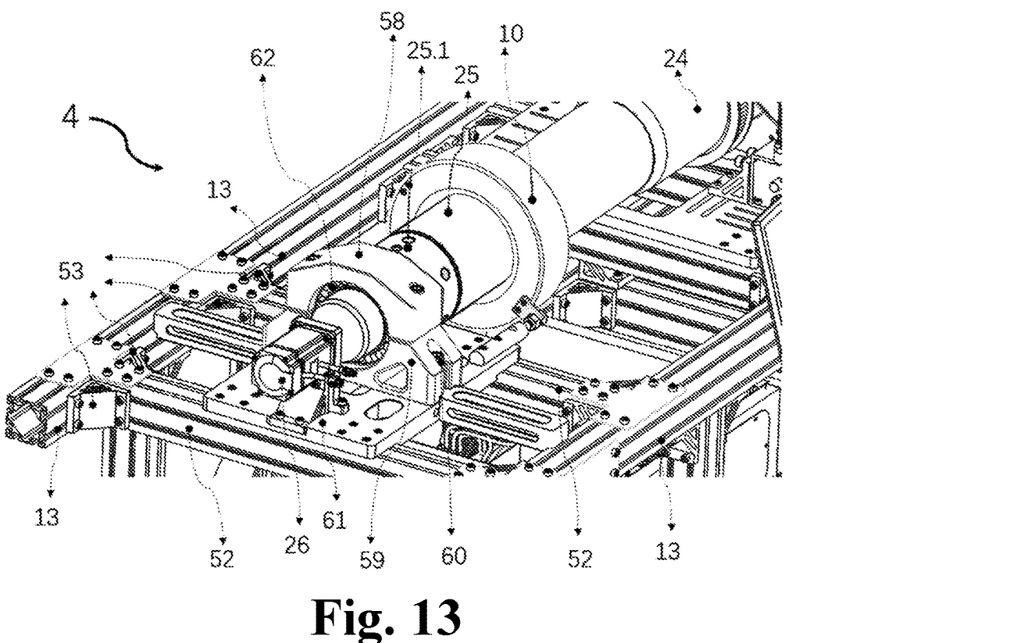
FIG. 13 shows the mandrel driving control and upper bearing support assembly of the rotary steerable tool according to an embodiment.
Figure 14:
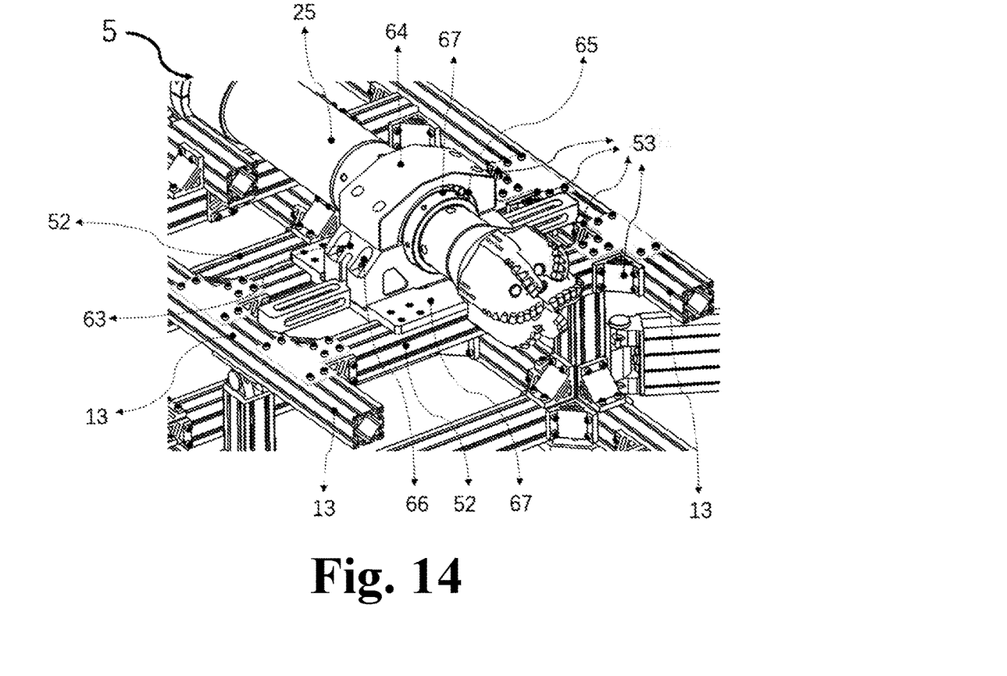

As shown in FIGS. 13 and 14, the apparatus further comprises an upper bearing support assembly 4 and a lower bearing support assembly 5, and the rotary steerable tool is positioned on the upper cross beams 13 of the rotary steerable tool testing bench 1 via the upper bearing support assembly 4 and the lower bearing support assembly 5;

The mandrel 25 at the upper end of the rotary steerable tool 6 is connected with a connector 25.1 via threads, and a first bearing 62 is fitted on the connector 25.1; the upper bearing support assembly 4 comprises a first upper bearing cover 58, a first lower bearing seat 59 and a first bearing 62, and the first upper bearing cover 58 and the first lower bearing seat 59 are of a split structure and are connected with each other by bolts, and the first bearing 62 is positioned between the first upper bearing cover 58 and the first lower bearing seat 59; the first lower bearing seat 59 is fixed on the bottom plate 61 of an upper support base by a first connecting bolt 60, the bottom plate 61 of the upper support base is fixed in transverse slots of the cross braces 52, and the first lower bearing seat 59 is movable smoothly along the transverse slots of the cross braces 52, so that the upper end of the rotary steerable tool 6 can be mounted and adjusted in the transverse direction; a servo motor 26 is fixed to the bottom plate 61 of the upper support base via a bracket, and transfers power via a coupling to the mandrel 25 of the rotary steerable tool. The cross braces 52 are fixed in straight slots in the upper cross beams 13 by several reinforcing ribs 53. The bottom plate 61 of the upper support base, on which the split bearing seat and the motor are fixed, can slide steplessly along the slots of the upper cross beams 13 in the axial direction of the rotary steerable tool. In such a design, the upper support base may be adjusted flexibly according to the specific length of the rotary steerable tool, to facilitate mounting and positioning of the upper support base. Therefore, the apparatus is highly universal and easy to mount and adjust.

The mandrel 25 at the lower end of the rotary steerable tool 6 is connected with a connector 25.2 via threads, and a second bearing 65 is fitted on the connector 25.2. The lower bearing support assembly 5 comprises a second upper bearing cover 64, a second lower bearing seat 63 and a second bearing 65, and the second upper bearing cover 64 and the second lower bearing seat 63 are of a split structure and are connected with each other by bolts, and the second bearing 65 is positioned between the second upper bearing cover 64 and the second lower bearing seat 63; the second lower bearing seat 63 is fixed on the bottom plate 67 of a lower support base by a second connecting bolt 66, the bottom plate 67 of the lower support base is fixed in transverse slots of the cross braces 52, and the second lower bearing seat 63 is movable along the transverse slots of the cross braces 52, so that the lower end of the rotary steerable tool 6 can be mounted and adjusted in the transverse direction. Moreover, the cross braces 52 are fixed in the straight slots in the upper cross beams 13 by several reinforcing ribs 53. The bottom plate 67 of the lower support base, on which the split bearing seat is fixed, can slide steplessly along the slots of the upper cross beams 13 in the axial direction of the rotary steerable tool. In such a design, the lower support base may be adjusted flexibly according to the specific length of the rotary steerable tool, to facilitate mounting and positioning of the lower support base. Therefore, the apparatus is highly universal and easy to mount and adjust.

The invention claimed is:

1. An apparatus for testing a rotary steerable tool, comprising:
    a rotary steerable tool testing bench; and a testing unit disposed on the rotary steerable tool testing bench,
    wherein, during operation, the rotary steerable tool testing bench is placed above an earth surface and supports the rotary steerable tool in a horizontal direction or in a inclined direction, and the testing unit performs a plurality of tests on the rotary steerable tool,
    wherein the rotary steerable tool testing bench comprises a plurality of upper cross beams, a plurality of fixed support columns, a plurality of detachable support columns, a plurality of lower cross beams, and a plurality of lateral stabilizing support feet,
    wherein at least one of the plurality of upper cross beams is connected with at least one of the plurality of lower cross beams via at least one of the plurality of fixed support columns and at least one of the plurality of detachable support columns, and
    wherein each lateral stabilizing support foot is articulated via pin shafts with a trunnion connected to a lower cross beam of the plurality of lower cross beams, and one detachable limit pin is disposed on the trunnion.

2. The apparatus according to claim 1, wherein the testing unit comprises a testing assembly, a low-speed rotation driving control assembly, or both, wherein, during operation, the testing assembly is disposed on a non-rotary steering sleeve of the rotary steerable tool, and the testing assembly measures a pushing force exerted on each of N ribs of the rotary steerable tool, transmits a signal of the pushing force via a slip ring assembly to a signal acquisition hardware interface box,
    wherein, during operation, the low-speed rotation driving control assembly drives a non-rotary steering sleeve of the rotary steerable tool to rotate, and
    wherein N is an integer larger than one.

3. The apparatus according to claim 2, wherein the testing assembly comprises N pushing force sensors, N top beams, and N universal load-bearing feet, wherein each universal load-bearing foot has a first end contacting one of the N ribs of the rotary steerable tool and a second end coupled to one of the N pushing force sensors via an adjusting stud, wherein an upper end of each pushing force sensor is coupled to one of the N top beams via a connector, and wherein each top beam has two feet affixed to the rotary steerable tool by placing each of the two feet between a tension-bearing cover plate and a tension-bearing base.

4. The apparatus according to claim 3, wherein the tension-bearing base is in a clearance fit with a main body of the non-rotary steering sleeve of the rotary steerable tool, and is slidably adjustable in an axial direction of the non-rotary steering sleeve, and the tension-bearing bases are mounted.

5. The apparatus according to claim 2, wherein the low-speed rotation driving control assembly comprises a servo motor, a worm and gear reducer, a toothed pulley, a base plate, and a cross brace, wherein the servo motor, the worm and gear reducer, and the toothed pulley are disposed on the base plate, and the base plate is connected with the cross brace, and the cross brace is disposed in a sliding channel of an upper cross beam.

6. The apparatus according to claim 1, wherein, during operation, the rotary steerable tool testing bench is positioned in a horizontal state or an inclined state; when the rotary steerable tool testing bench is in the horizontal state, the detachable support columns comprise planar support columns in the same length; and when the rotary steerable tool testing bench changes from the horizontal state to the inclined state, the detachable support columns comprise a plurality bevel support columns; one end of each of the plurality of upper cross beams without the articulation structure is lifted, the upper cross beams are rotated around the articulation structures, and bevel support columns in different heights and upper support plates are arranged.

7. The apparatus according to claim 1, further comprising an upper bearing support assembly and a lower bearing support assembly, and the rotary steerable tool is positioned on the plurality of upper cross beams via the upper bearing support assembly and the lower bearing support assembly.

8. The apparatus according to claim 7, wherein the upper bearing support assembly comprises a first upper bearing cover, a first lower bearing seat and a first bearing, and the first upper bearing cover and the first lower bearing seat are of a split structure, the first upper bearing cover and the first lower bearing seat are connected by bolts, and the first bearing is positioned between the first upper bearing cover and the first lower bearing seat; the first lower bearing seat is affixed to a bottom plate of an upper support base, which is affixed in transverse slots of the cross brace, and the first lower bearing seat is movable along the transverse slots of the cross brace.

9. The apparatus according to claim 7, wherein the lower bearing support assembly comprises a second upper bearing cover, a second lower bearing seat and a second bearing, and the second upper bearing cover and the second lower bearing seat are of a split structure, the second upper bearing cover and the second lower bearing seat are connected by bolts, and the second bearing is positioned between the second upper bearing cover and the second lower bearing seat; the second lower bearing seat is affixed to a bottom plate of a lower support base, which is affixed in transverse slots of the cross brace, and the second lower bearing seat is movable along the transverse slots of the cross brace.

* * * * *